Nov. 16, 1965  L. H. J. TOLLET  3,218,236
NUCLEAR REACTORS
Filed May 21, 1962  3 Sheets-Sheet 3

3,218,236
NUCLEAR REACTORS
Louis Henri Joseph Tollet, Brussels, Belgium, assignor, by mesne assignments, to Société anglo-belge Vulcain, Société anonyme, Brussels, Belgium
Filed May 21, 1962, Ser. No. 196,120
Claims priority, application Belgium, May 24, 1961, 481,082
4 Claims. (Cl. 176—42)

This invention relates to nuclear reactors. More particularly, it pertains to apparatus for varying the moderation in a nuclear reactor.

There are nuclear reactors in which cooling fluid and moderating fluid flow in separate circuits for controlling reactivity. Such reactors may be regulated wholly or in part by modifying the composition of the moderator, the moderating properties of said composition thereby being improved or reduced with a consequent increase or reduction in reactivity.

According to the present invention, modifications in moderating properties are provided by means of reciprocable moderator elements in the core of a fluid moderated reactor, said moderator elements having moderating characteristics differing from those of said fluid. The invention may be understood by reference to the following description of illustrative embodiments and by reference to the accompanying drawings, in which like reference numerals are assigned to like parts throughout. In the drawings.

Figures 1, 2:
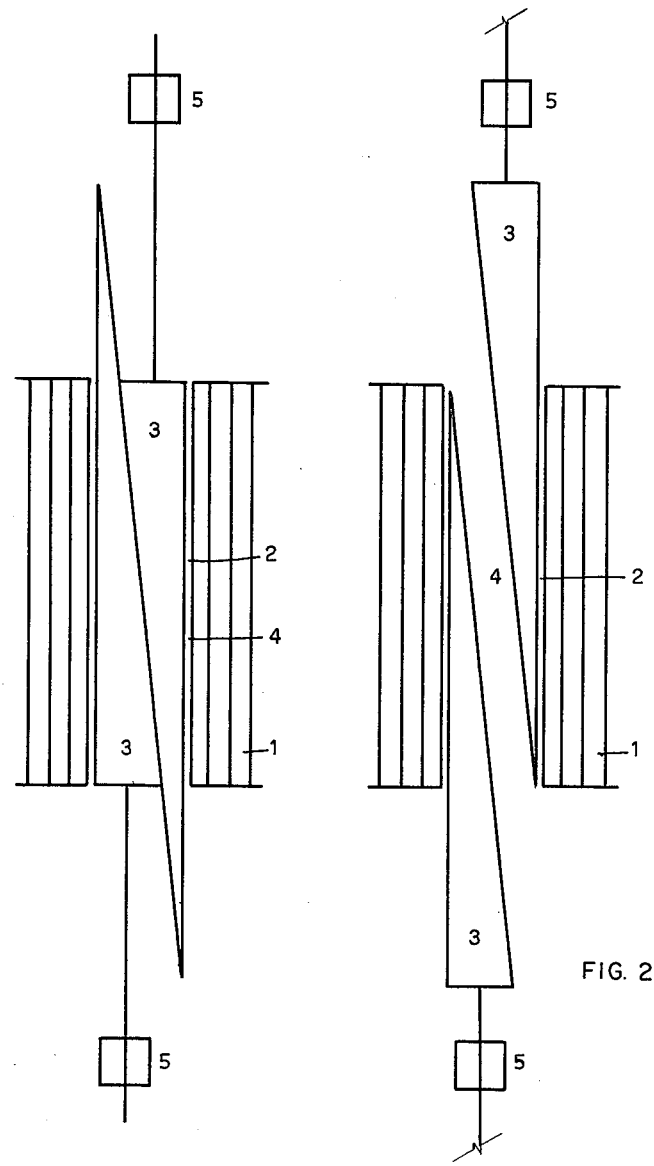
FIGURE 1 is a schematic diagram of a nuclear reactor core provided with the apparatus of the present invention.
FIGURE 2 is similar to FIGURE 1, but shows the reciprocable moderator elements of the present invention in a different position.

In the embodiment shown in FIGURE 1, there is a core 1 through which extends a channel 2 defining a moderator space. Elongated, profiled, reciprocable receptacles 3, actuated by known actuating means 5, penetrate said space. The actuating means 5 are adapted to move the receptacles 3 in opposite directions over substantially equal distances. Receptacles 3 constitute moderator elements and contain moderating fluid. The portion of channel 2 not occupied by the receptacles 3 is referred to as outer enclosure 4. Enclosure 4 also contains moderating fluid. The moderating fluid in outer enclosure 4 differs in moderating characteristics from the fluid in receptacles 3. The profile of the receptacles 3 is such that when the receptacles are in the fully inserted position shown in FIGURE 1, the total section of the receptacles is constant at all levels in the space 2. As shown in FIGURE 1, receptacles or moderator elements 3 extend throughout channel 2 and are longer than the channel by a given distance. To modify the moderation, it is necessary only to withdraw the receptacles 3 through the appropriate distance, but not more than said given distance. FIGURE 2 shows the receptacles 3 in fully withdrawn position. The apparatus described above permits modifying the moderation in the same manner at all levels inside the channel 2, because the moderator elements 3 vary uniformly and similarly along their length, because each varies in the opposite longitudinal direction, and because said elements extend throughout the channel and are not moved more than said given distance.

Various modifications of the apparatus are set forth hereinafter. For instance, the shapes of the receptacles 3 in a given reactor may be different from one another. However, in that case it is necessary to effect for all their positions a homogeneity of moderation throughout the height of the core.

Figure 3:
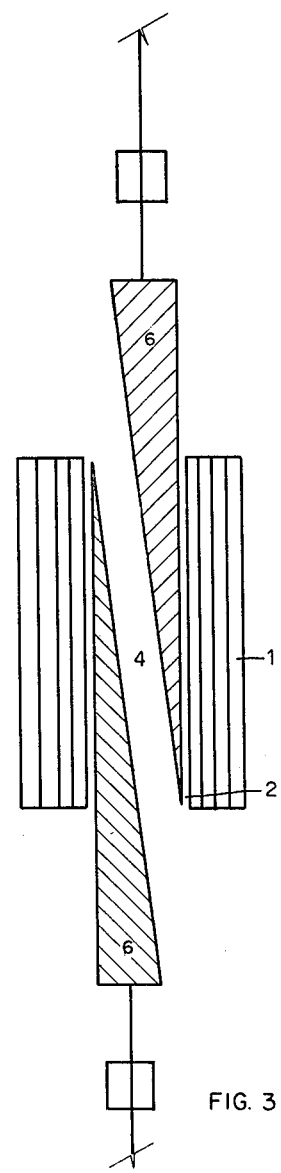
FIGURE 3 is similar to FIGURE 2, but shows an alternate form of moderator element.

Another possible modification is to replace the receptacles 3 and their included moderating fluid with solid masses 6, as shown in FIGURE 3. In this embodiment, there are a core 1, channel 2 within the core, enclosure 4 and actuating means 5, all of which are similar to the corresponding parts in FIGURES 1 and 2. Enclosure 4 is filled with moderator fluid. The two shaped masses 6 are of truncated conical shape. The material of the masses 6 may have moderating properties and its characteristics must be different from those of the fluid in enclosure 4. The operation of this embodiment is similar to that of the FIGURES 1 and 2 embodiment. The extent of penetration of masses 3 into the space 3 determines the amount of moderator within enclosure 4 and, consequently, the moderation. The change in volume is identical throughout the height of the core.

When receptacles, such as those shown in FIGURES 1 and 2, are employed, the injection of soluble or insoluble poison into the receptacles may be used for controlling the reactor. Bringing the reactor up to power may be effected by removing poisoned moderator from the receptacles and replacing it with fresh moderator. The volume of receptacles 3 being small, the amount of poisoned moderating fluid to be stored, is also small. The receptacles have simple interior shapes free of recesses, facilitating rinsing with a small amount of rinsing fluid.

Figure 4:
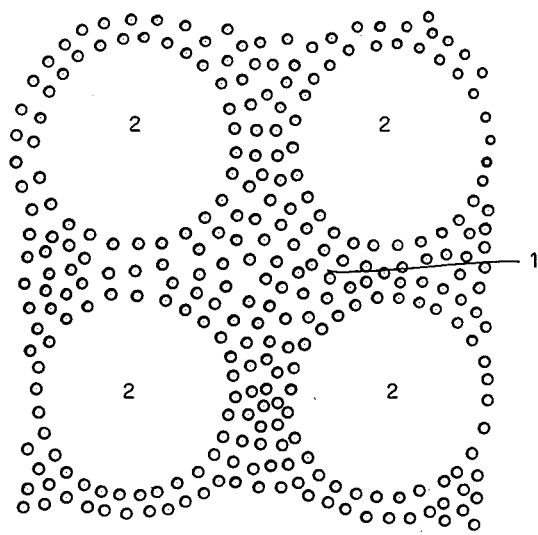
FIGURES 4 and 5 are schematic diagrams of two different fuel arrangements with which the apparatus of the invention may be employed.
Figure 5:
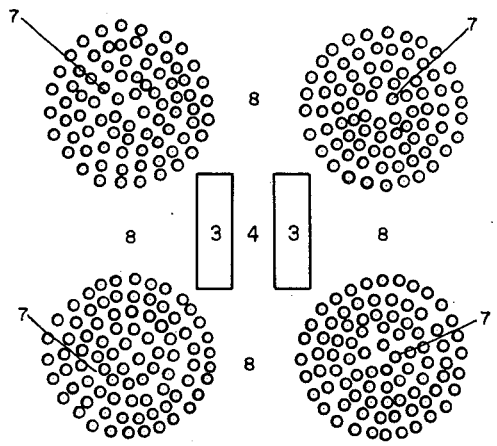

In the embodiments shown in FIGURES 1, 2 and 3, the fuel elements of the core are distributed around and between the moderator spaces 2, as illustrated in FIGURE 4. However, all of the aforementioned embodiments may be applied to a reactor in which the elements of the core are grouped in sheaves 7, as shown in FIGURE 5 and the moderator fluid is distributed between the sheaves. In such a case, the necessary members for carrying out the variable moderation are arranged in the intervals 8 between the sheaves.

I claim:
1. A nuclear reactor comprising a core; a channel defining a moderator space extending through said core; a fluid moderator in said channel; a pair of elongated reciprocable moderator elements of different moderating characteristics than those of said fluid moderator extending throughout said channel, each of said reciprocable moderator elements being longer than said channel by a given distance, said elements varying uniformly and similarly in cross-sectional area along their length, and each varying in the opposite longitudinal direction from the other; means for simultaneously moving said reciprocable moderator elements in opposite directions over substantially equal distances but not more than said given distance.

2. Apparatus in accordance with claim 1 wherein said moderator elements are hollow receptacles containing moderator liquid.

3. Apparatus in accordance with claim 1 wherein said moderator elements are solid masses.

4. Apparatus in accordance with claim 1 wherein said moderator elements contain poison.

References Cited by the Examiner

UNITED STATES PATENTS

| | | | |
|---|---|---|---|
| 2,837,475 | 6/1958 | Newson | 176—17 |
| 2,898,281 | 8/1959 | Untermyer et al. | 176—34 |
| 2,900,316 | 8/1959 | Kaufman et al. | 176—34 |
| 2,904,487 | 9/1959 | Dickson | 176—23 |
| 2,905,612 | 9/1959 | Borst | 176—34 |
| 2,920,025 | 1/1960 | Anderson | 176—65 |
| 2,935,456 | 5/1960 | Husten | 176—34 |
| 2,976,227 | 3/1961 | Wheeler | 176—42 |

FOREIGN PATENTS

| | | |
|---|---|---|
| 205,614 | 10/1959 | Austria. |
| 1,239,165 | 7/1960 | France. |

OTHER REFERENCES

Benzler et al.: German Application No. 1,049,014, printed Jan. 22, 1959 (KL 21g21/31) (3 pp. spec., 1 sht. dwg.) 176/86.

REUBEN EPSTEIN, *Primary Examiner.*

L. DEWAYNE RUTLEDGE, CARL D. QUARFORTH,
*Examiners.*